US011240350B1

(12) United States Patent
Lind

(10) Patent No.: US 11,240,350 B1
(45) Date of Patent: Feb. 1, 2022

(54) MESSAGING SYSTEM FOR COMBINING AND SENDING PROMOTIONAL DATA WITH CONVENTIONAL MESSAGES VIA A COMMUNICATIONS NETWORK

(71) Applicant: Blake Lind, Prosper, TX (US)

(72) Inventor: Blake Lind, Prosper, TX (US)

(*) Notice: Subject to any disclaimer, the term of this patent is extended or adjusted under 35 U.S.C. 154(b) by 718 days.

(21) Appl. No.: 15/435,062

(22) Filed: Feb. 16, 2017

Related U.S. Application Data

(63) Continuation-in-part of application No. 14/150,636, filed on Jan. 8, 2014, now abandoned.

(60) Provisional application No. 62/352,771, filed on Jun. 21, 2016, provisional application No. 61/822,496, filed on May 13, 2013, provisional application No. 61/761,331, filed on Feb. 6, 2013.

(51) Int. Cl.
  *G06Q 30/02* (2012.01)
  *H04L 29/06* (2006.01)
  *H04L 12/58* (2006.01)

(52) U.S. Cl.
  CPC ......... *H04L 67/42* (2013.01); *G06Q 30/0277* (2013.01); *H04L 51/04* (2013.01)

(58) Field of Classification Search
  CPC ...... H04L 67/42; H04L 51/04; G06Q 30/0277
  See application file for complete search history.

(56) References Cited

U.S. PATENT DOCUMENTS

| | | | |
|---|---|---|---|
| 6,757,661 B1* | 6/2004 | Blaser | G06Q 30/02 705/14.54 |
| 2001/0039658 A1* | 11/2001 | Walton | H04N 5/44543 725/51 |
| 2002/0196275 A1* | 12/2002 | Willner | G06Q 30/02 715/744 |
| 2004/0015608 A1* | 1/2004 | Ellis | G06Q 30/02 709/246 |
| 2005/0060377 A1* | 3/2005 | Lo | H04L 67/20 709/206 |

(Continued)

OTHER PUBLICATIONS

"Everything You Need to Know about Using Keywords in SMS Marketing" (Barber, Holly et al., published on May 14, 2015 at https://www.firetext.co.uk/blog/everything-you-need-to-know-about-using-keywords-in-sms-marketing/) (Year: 2015).*

*Primary Examiner* — James M Detweiler
(74) *Attorney, Agent, or Firm* — Michael Diaz

(57) ABSTRACT

The present invention is a messaging system for combining a set of promotional data with an instant message. The system includes a network, a sending communications terminal connected to the network and a sending processor programmed for sending an instant message via the network. Additionally, the system includes a recipient communications terminal connected to the network configured for receiving an instant message from the sending communications terminal. The system also includes a messaging server providing instant messaging service to the sending communications terminal and the recipient communications terminal and a combiner for combining a singular instant message sent from the sending communications terminal and the set of promotional data into a single cohesive message. The recipient communications terminal has a recipient processor for presenting the set of promotional data with the instant message as a cohesive message on a messaging.

22 Claims, 7 Drawing Sheets

(56) References Cited

U.S. PATENT DOCUMENTS

| | | |
|---|---|---|
| 2007/0130009 A1 | 6/2007 | Steelberg et al. |
| 2007/0259634 A1 | 11/2007 | MacLeod et al. |
| 2008/0034040 A1 | 2/2008 | Wherry et al. |
| 2008/0043950 A1* | 2/2008 | Myers ................ G06Q 30/0241 379/114.13 |
| 2008/0086356 A1* | 4/2008 | Glassman .............. G06Q 30/02 705/14.41 |
| 2008/0147501 A1* | 6/2008 | Gilliam .............. G06Q 30/0277 705/14.66 |
| 2009/0011781 A1* | 1/2009 | Merrill ................ H04L 12/1859 455/466 |
| 2009/0076917 A1* | 3/2009 | Jablokov ............ G06Q 30/0239 705/14.39 |
| 2009/0228346 A1* | 9/2009 | Hu ......................... G06Q 30/02 705/14.41 |
| 2010/0070370 A1* | 3/2010 | Waltman ............ G06Q 30/0267 705/14.64 |
| 2010/0088185 A1* | 4/2010 | Wen .................... G06Q 30/0276 705/14.72 |
| 2010/0281364 A1 | 11/2010 | Sidman |
| 2012/0124466 A1* | 5/2012 | Sinn ....................... G06Q 30/02 715/255 |
| 2012/0246003 A1 | 9/2012 | Hart et al. |
| 2013/0132191 A1* | 5/2013 | Galai ................. G06Q 30/0251 705/14.49 |
| 2013/0226689 A1* | 8/2013 | Nemitz .............. G06Q 30/0251 705/14.41 |
| 2015/0186952 A1* | 7/2015 | Brown ............... G06Q 30/0254 705/14.52 |

\* cited by examiner

MESSAGING SYSTEM FOR COMBINING AND SENDING PROMOTIONAL DATA WITH CONVENTIONAL MESSAGES VIA A COMMUNICATIONS NETWORK

RELATED APPLICATIONS

This application is a continuation-in-part application of co-pending U.S. patent application Ser. No. 14/150,636 entitled "Promotional System and Method Using Messaging Service" filed on Jan. 8, 2014 under the name of Blake Lind which claims the benefit of U.S. Provisional Patent Application Ser. No. 61/761,331 filed Feb. 6, 2013 by Blake Lind, U.S. Provisional Patent Application Ser. No. 61/822,496 filed May 13, 2013 by Blake Lind and Provisional Patent Application Ser. No. 62/352,771 filed Jun. 21, 2016, which are hereby incorporated by reference.

BACKGROUND OF THE INVENTION

Field of the Invention

This invention relates to a communication system. Specifically, and not by way of limitation, the present invention relates to a system which combines promotional data with a conventional message being transmitted from one communication device to a second communication device.

Description of the Related Art

The use of instant messages between mobile communications devices has exploded over the last decade. Today it is quite common for a person to communicate far more through instant messages than voice calls. Additionally, businesses strive to find new ways to provide informative promotional data to individuals. Furthermore, businesses strive in incentivize the transfer and receipt of promotional data. It would be advantageous to utilize a messaging system which automatically combines a conventional message being sent from one mobile phone to another mobile phone with promotional data. Additionally, it would be advantageous to have a system which provides an incentive by both the sender and the recipient to use such a system. Although there are no known prior art teachings of a solution to the aforementioned deficiency and shortcoming such as that disclosed herein, prior art references that discuss subject matter that bears some relation to matters discussed herein are U.S. Publication No. 2010/0281364 to Sidman (Sidman) and U.S. Publication No. 2012/0246003 to Hart et al. (Hart).

Sidman discloses a system which provides a portable universal profile (PUP). Sidman's system enables a user to package web links to the information of interest to the person as a responsive tag or PUP-interface. These links, content, products for which they wish to promote are provided in a personal widget. This widget is portable and is posted online in such websites as MySpace.com and Facebook.com. Sidman fails to disclose automatically combining advertisement data with a conventional message into a cohesive message via a communication system to another communication device. Sidman merely discloses providing links on static web pages.

Hart discloses an advertising system which may send an advertisement via an instant message to a mobile device. However, Hart fails to teach or suggest that the communications terminal automatically combines promotional data with a conventional message and sending it to a recipient as a cohesive message. Rather, Hart merely teaches that an advertising company (i.e., merchant) sends blasts of an advertisement to potential clients rather than combining a person to person conventional text message with a set of promotional data.

Thus, a system and method is needed which combines and sends promotional data with a conventional message being transmitted from one communication device to a second communication device as a cohesive message. It is object of the present invention to provide such a system.

SUMMARY OF THE INVENTION

In one aspect, the present invention is a messaging system for combining a set of promotional data with an instant message. The system includes a network, a sending communications terminal connected to the network and a sending processor programmed for sending an instant message via the network. Additionally, the system includes a recipient communications terminal connected to the network configured for receiving an instant message from the sending communications terminal. The system also includes a messaging server providing instant messaging service to the sending communications terminal and the recipient communications terminal to enable transmittal of an instant message from the sending communications terminal to the recipient communications terminal and a combiner for combining a singular instant message sent from the sending communications terminal to the recipient communications terminal and the set of promotional data into a single cohesive message. The recipient communications terminal has a recipient processor for processing the instant message and presenting the set of promotional data with the instant message as a cohesive message on a messaging display of the recipient communications terminal.

DESCRIPTION OF THE INVENTION

Figure 1:
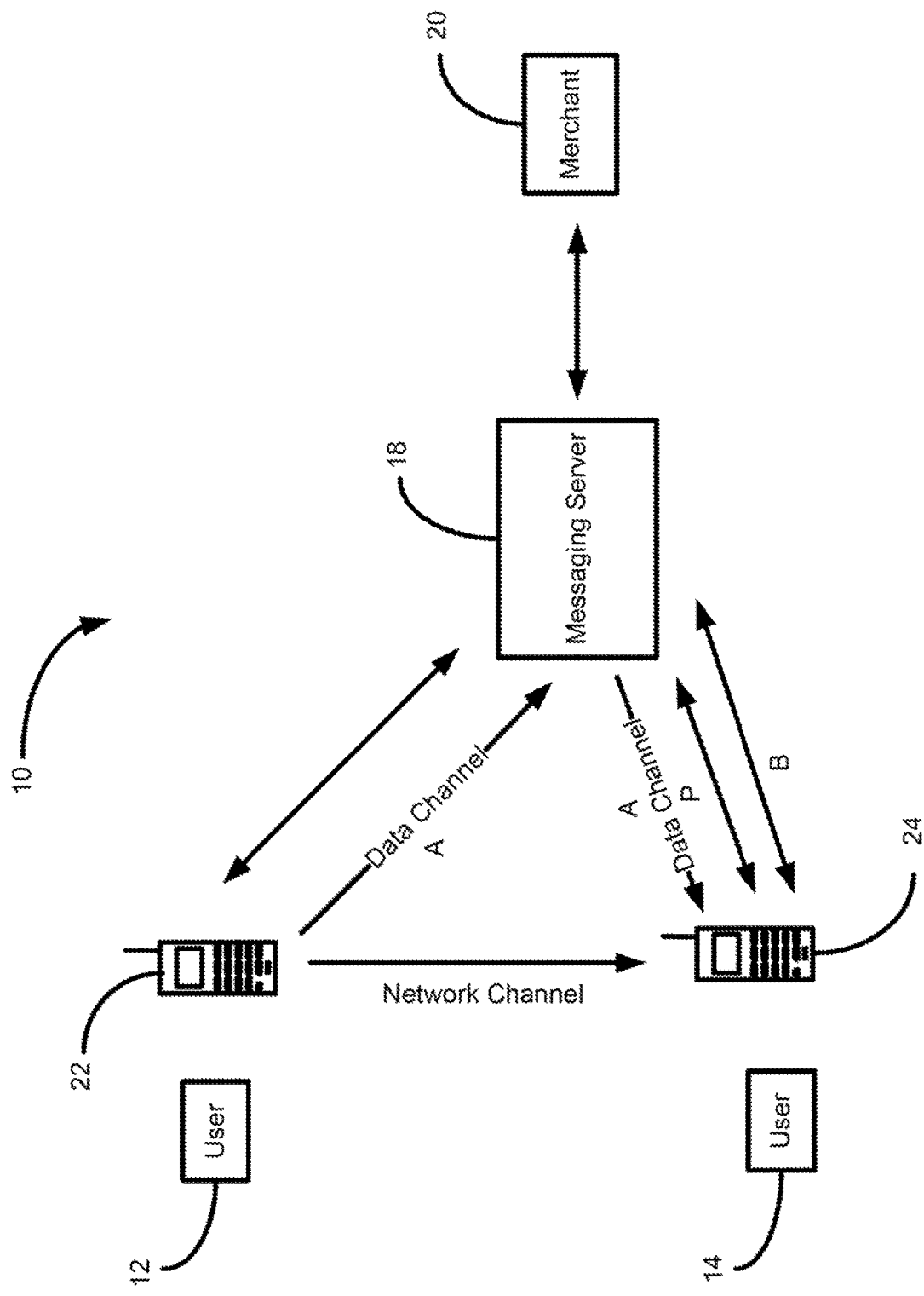
FIG. 1 is a simplified block diagram of a promotional system in one embodiment of the present invention.

The present invention is a system which combines a conventional message being sent from one communication device to a second communication device with promotional data. FIG. 1 is a simplified block diagram of a promotional system 10 in one embodiment of the present invention. The promotional system includes a first user 12 communicating with a second user 14 via a communications network. The promotional system also includes a messaging server 18 connected to the network. The messaging server may also communicate with one or more merchants 20. The user 12 utilizes a communications terminal 22 to communicate with the user 14. In addition, the user 14 utilizes a communications terminal 24 to communicate with the user 12. Although two users are depicted in FIG. 1, it should be understood that the promotional system 10 may use any number of users. The communications terminals 22 and 24 may include any suitable device operable to act as a client on a network. Illustrative communications terminals include, but are not limited to, mobile phones, personal computers, desktop computers, laptops, servers, including, but not limited to Voice over Internet Protocol (VoIP) telephones, smart telephones, wireless devices, such as cellular telephones, personal digital assistants, tablets, etc. Each communication terminal 22 and 24 may be configured to transmit and receive messages with the communications network. The communications terminals may include a location capability to providing location information to the user and the instant messaging system 18, such as Global Positioning System (GPS). The communications network may include any number of networks capable of providing communications between the plurality of users and the messaging server 18. For example, the communications network may be one or more or any combination of wireless networks, data or packet networks, publicly switched telephone networks (PSTN), Internet. etc. The merchant 20 may be any business or individual wishing to advertise their services, goods, or desire to inform the public of news related to the merchant 20.

Figure 2:
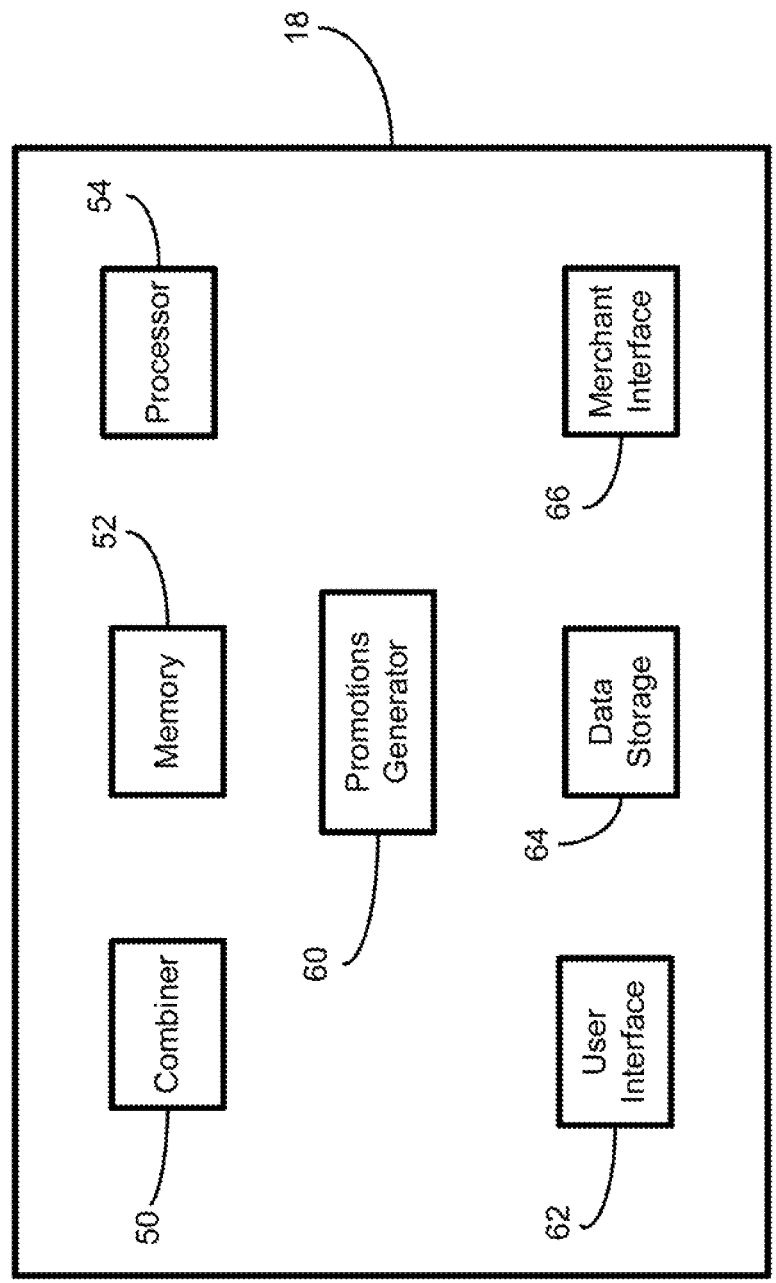
FIG. 2 is a simplified block diagram of some of the components of the messaging server in one embodiment of the present invention.

The messaging server 18 provides unique promotional and instant messaging services between a plurality of users, such as users 12 and 14. FIG. 2 is a simplified block diagram of some of the components of the messaging server 18 in one embodiment of the present invention. In one embodiment, the messaging server may optionally include a combiner 50. In one embodiment, the combiner 50 may provide the function of combining a conventional message with promotional data in a single cohesive message. The messaging server 18 may be any server, computer or device configured to process the instant messages services discussed below between a plurality of users. In one embodiment, the messaging server 18 may also include a memory 52 for storing a set of instructions and a processor 54 for executing the instructions. The processer may access information from, and store information in a nonremovable memory, a removable memory, or a combination thereof, also collectively referred to herein as computer readable media. Illustrative nonremovable memory may consist of RAM, ROM, a hard disk, or other well-known memory storage technologies. Illustrative removable memory may consist of one or more Subscriber Identity Module (SIM) cards, or other well-known memory storage technologies, such as "smart cards," magnetic disks, floppy disks, optical disks, magneto-optical disks, magnetic tapes, or any suitable non-volatile memory. As will be discussed below, the set of instructions executed by the server 18 permit the server to process messages coupled with promotions between a plurality of users. Promotional data may be any type of advertisement or announcement and may incorporate further links or directions to other sources of information, such as hyperlinks to websites, mobile websites, image/graphics, taglines or headers, text with links, splash pages, phone numbers, etc. In any case, the present invention provides the function of combining a conventional message (i.e., a direct and singularly directed message from one communications terminal to another communication terminal) with a second set of data, specifically promotional data into one single cohesive message for the recipient.

Still referring to FIG. 2, the messaging server 18 may also include a promotions generator 60, a user interface 62, data storage 64, and a merchant interface 66. The promotions generator provides a component of the messaging server 18 for coupling a conventional electronic message (i.e., instant message) with a second set of data, specifically a promotion from one user 12 to another user 14. The user interface 62 enables an interface for a user to communicate with the messaging server 18. In particular, the user interface may include generation and transmittal of a software application or mobile application, commonly referred to as an "app" which is downloaded to the user's communications terminal. As referred to in the present invention herein, the software application is the application. The application, in one embodiment, may be downloaded to the user's communications terminal to enable communications with the user interface 62 of the instant messaging system as well as facilitate transmittal and receipt of messages accompanied with a promotion. The data storage 64 may include data related to the user, the users profile, promotions and promotion profiles, and merchant information. The merchant interface 66 may be utilized to provide an interface for the merchant to communicate with the instant messaging system, thereby allowing the merchant to provide information on the promotion to be utilized by the promotions generator 60.

Figure 3:
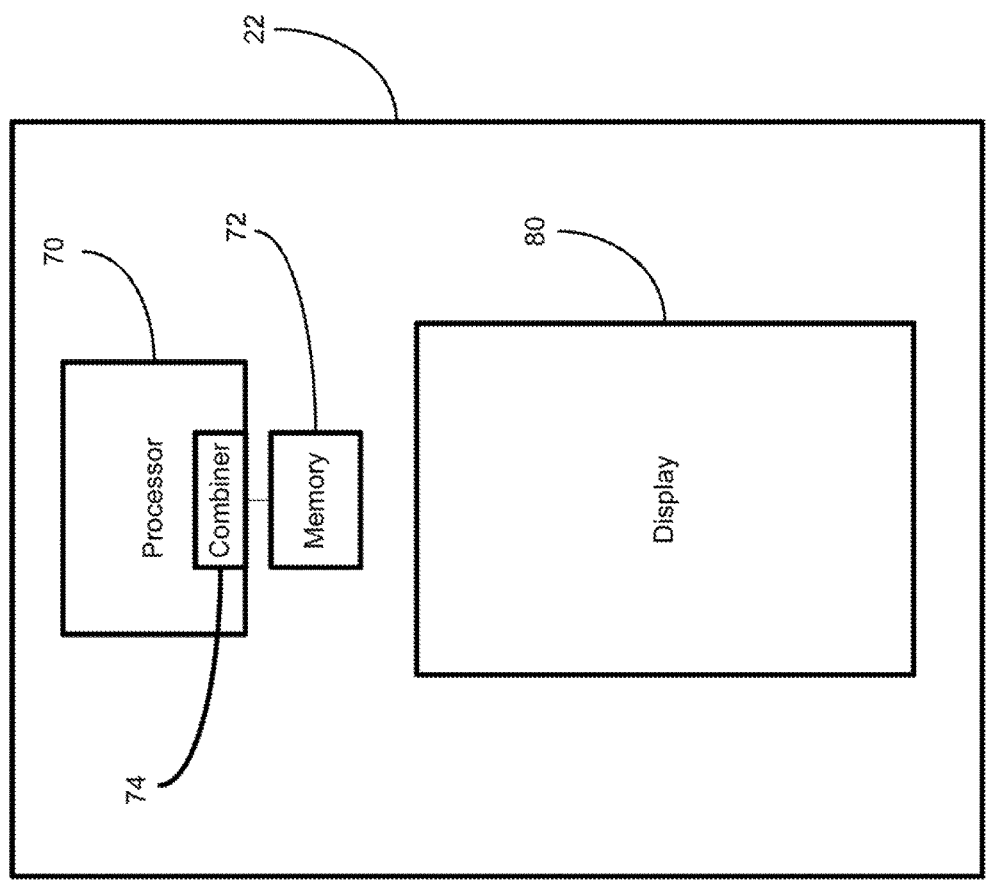
FIG. 3 is a simplified block diagram of a communications terminal.

As discussed above, in one embodiment, each user may download the application for use in interacting with the instant messaging system 18. The downloaded application resides in the communications terminal 22 or 24. In another embodiment, the application may be the pre-installed in the communications terminal. FIG. 3 is a simplified block diagram of a communications terminal 24, such as a mobile phone being enabled with the present inventions application, referred herein as the promotional system app or "IMGR app". The communications terminal 22 includes a processor 70 and memory 72. The processor and memory may be any mechanism allowing computing services for the terminal 22 and the execution of the downloaded application from the messaging server 18.

In one embodiment, the present invention is an instant messaging app. The user downloads the application from the instant messaging system via the messaging server 18. In another embodiment, the application may be the pre-installed in the communications terminal. As depicted in FIG. 1, the application (IMGR app) resides in the memory 72 of the communications terminal 24 and executed by the processor 70. Furthermore, the communications terminal 24, in one embodiment, may include a combiner 74. which would perform the same functions as the combiner 50 in the messaging server 18, which provides the function of combining a conventional message with promotional data in a single cohesive message. Additionally, the communication terminal 24 may include a display 80.

Referring back to FIG. 1, FIG. 1 illustrates the sending communication terminal 22 sending a message to an IMGR app enabled communication terminal 24. The messaging server 18 stores and determines all of the master users profile data (P), and centralized promotional data (B). The server communicates to the IMGR app enabled communications terminal 24 via a user profile Application Program Interface (API) and a promotional data API the most updated information pertaining to the user, the promotional data, and what data to be displayed with the conventional message data (A)

composed and sent by communications terminal 22. The IMGR app enabled communications terminal 24 receives all of the user profile information of their contacts who also are IMGR app enabled via the User Profile API and stores all updated User Profile information from the messaging server 18 on its local database, specifically the memory 72. The communications terminal 24 downloads and stores this information one time and then only downloads new/updated information as necessary. [This version above shows the receive and combine version]

Furthermore, the IMGR enabled communication terminal 24 receives all of the promotional information via the promotional API and stores all updated promotional information including graphics, link uniform resource locator (URL)'s, link text, promotion rotation logic, etc. . . . received from the messaging server 18 on the memory 72 or known as a local database (currently referred to as sqlite). The communications terminal 24 downloads and stores the information one time and then only downloads new/updated information as necessary. The promotional data API may provide for two way communication. The communications terminal 24 may be sending certain promotional settings data to the server 18 that may help to determine promotional display logic for that user.

FIG. 1 illustrates two different scenarios. In the first scenario, communications terminal 22 is also IMGR app enabled. In this scenario, the message A is composed by the user 12 and sent via a data channel routed to the messaging server 18 and then to the receiving communications terminal 24. The instant message A is routed over the data channel to the messaging server 18 and then on the data channel to the communications terminal 24. In the second scenario, the communications terminal 22 is not IMGR app enabled. In this scenario, the message A is composed and sent via a network channel directly to the receiving communications terminal 24. No other data is sent in this second scenario.

If allowable by the communications terminal 24, the communications terminal 24 may also utilize the IMGR app as the default Text/SMS Messenger. When the message data A is received either from the network channel or the data channel (both scenarios), the IMGR app enabled communications terminal 24 takes the message data A and combines it with all of the second type of data, specifically the promotional data B stored in the memory 72 and then displays it together as one cohesive message as illustrated in FIG. 4.

Figure 4:
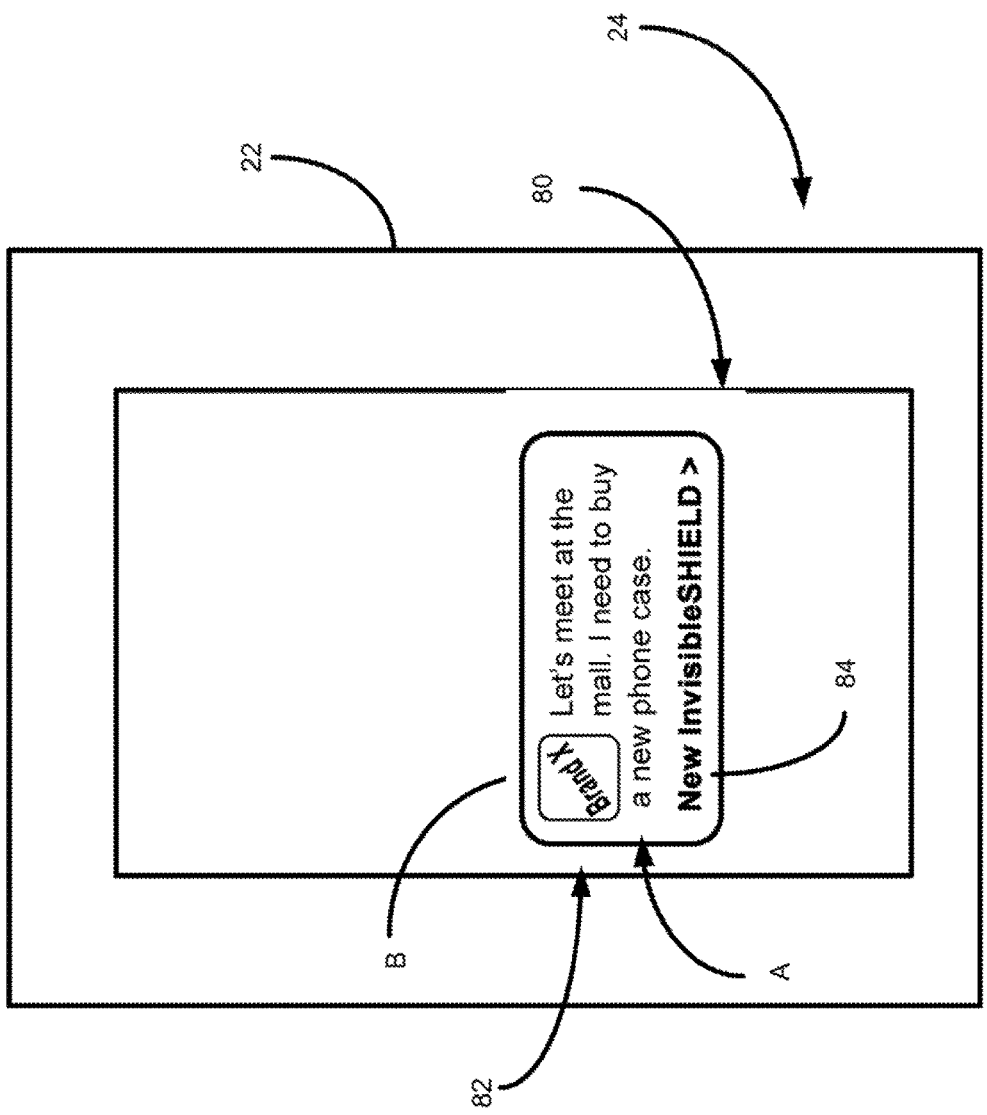
FIG. 4 is a front view of the display illustrating a cohesive message.

FIG. 4 is a front view of the display 80 illustrating a cohesive message 82. The cohesive message incorporates the message A and promotional data B in a single unified message. Furthermore, in one embodiment of the present invention, the cohesive message 82 may include other informative data, such as a promotional link 84. As depicted in FIG. 4, the promotional data is aligned with the conventional message while the text link 84 is located immediately below the body of the conventional message A. The cohesive message may take any form which integrates the promotional data with the message A.

In one embodiment, the combiner 74 of the communications terminal 24 combines the data from message A (received either through the data channel or the network channel) with the data B within a local app within the processor 70 and displays all data in a cohesive message 82 within the message bubble or within the messaging screen area. The promotional data B may be displayed anywhere within the messaging screen display area. In the present invention, the promotional data B displayed is triggered to be combined with the message A by the receipt of a new message from a contact and displays along with that message in a cohesive fashion.

In one embodiment of the present invention, the promotional data B and the user data P are both received from the messaging server 18 and stared on the communications terminal 24. The messaging server, through its processor 54 may provide a direction on the promotional information provided to the communication terminal 24, such as which promotion to display, the rotation and order logic, the promotional image graphic display, where and how to display the image, the use of a tap link URL, pop up, or promotional screen to go to, the text link, the actual URL behind the text link, bubble color and other promotional material. It should be noted that a text link differs from a hyperlink in that a text link is text (which does not show the URL) which is hyperlinked to another website or other location in another application or program (e.g., "patent fees") while a hyperlink shows the URL. {This discusses text links]

Figure 5:
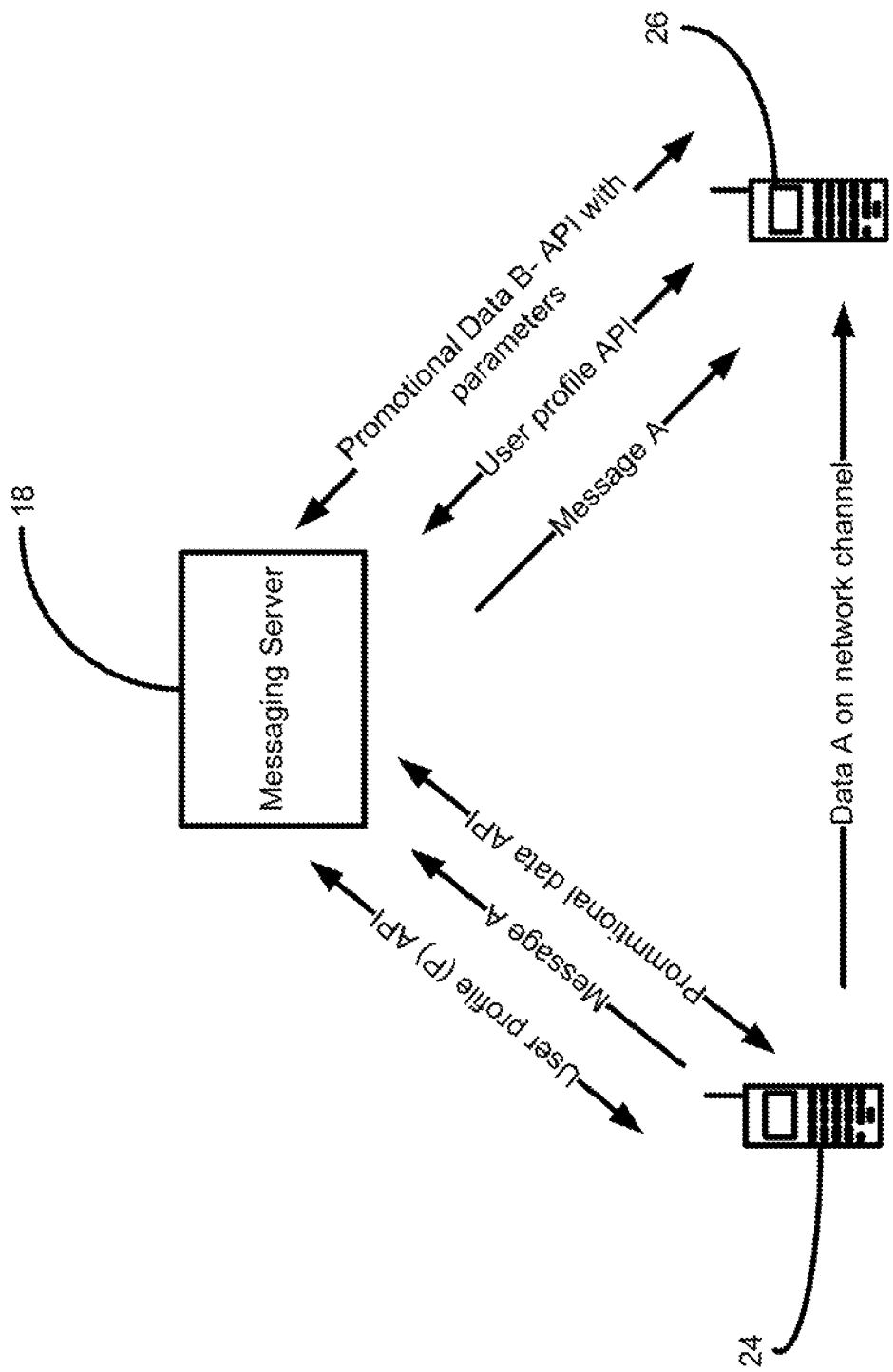
FIG. 5 is a simplified block diagram illustrating the IMGR app enabled communications terminal providing personal promotional data within the communications terminal to another communications terminal.

FIG. 5 is a simplified block diagram illustrating the IMGR app enabled communications terminal 24 providing personal promotional data within the communications terminal 24 to a communications terminal 26. In one embodiment, the processor 70 is programmed to create a plurality of sets of pre-packaged promotional data which may be stored in the memory 72 of the communications terminal 24. This pre-packaged personal promotion data (a sender created second set of data) may be sent to the messaging server 18.

The IMGR app enabled communications terminal 24 may create a plurality sets of pre-packaged data (i.e. personal promotional data) (C) within the processors local application. The sets of pre-packaged data C are saved and stored locally in the memory 72 of the communications terminal 24. This data C is also transmitted to the messaging server 18. The user 14 of the communications terminal 24 may also provide preferences to auto-include and/or rotate the sets of pre-packaged data C with the conventional messages A, or may be manually select a specific prepackaged data C set to be included within each message needed via a user interface. [This discusses creating promotions]

Within the communications terminal 24, once a set of pre-packaged data C is created by the user 14, the new data is transmitted and communicated via the Promotional Data API to the messaging server 18. The new data C created by the user 14 is stored with and becomes part of the main centralized promotional data (B) stored in the messaging server 18 available to IMGR app enabled communications terminals.

The messaging server 18 receives the user created promotional data C from the communications terminal 24 where it is stored in the memory 52 of the messaging server 18. Furthermore, the promotional data C may be combined by the combiner 50 with the centralized promotional data B discussed in FIG. 1. This promotional data C becomes a part of the centralized promotional data B. The receiving communications terminal 26 may or may not be IMGR app enabled. If the communications terminal 26 is IMGR app enabled, all data is received via a data channel and the API through the messaging server 18. If the communications terminal 26 is not IMGR app enabled, all data (text/SMS only) is received via the network channel.

Figure 6:
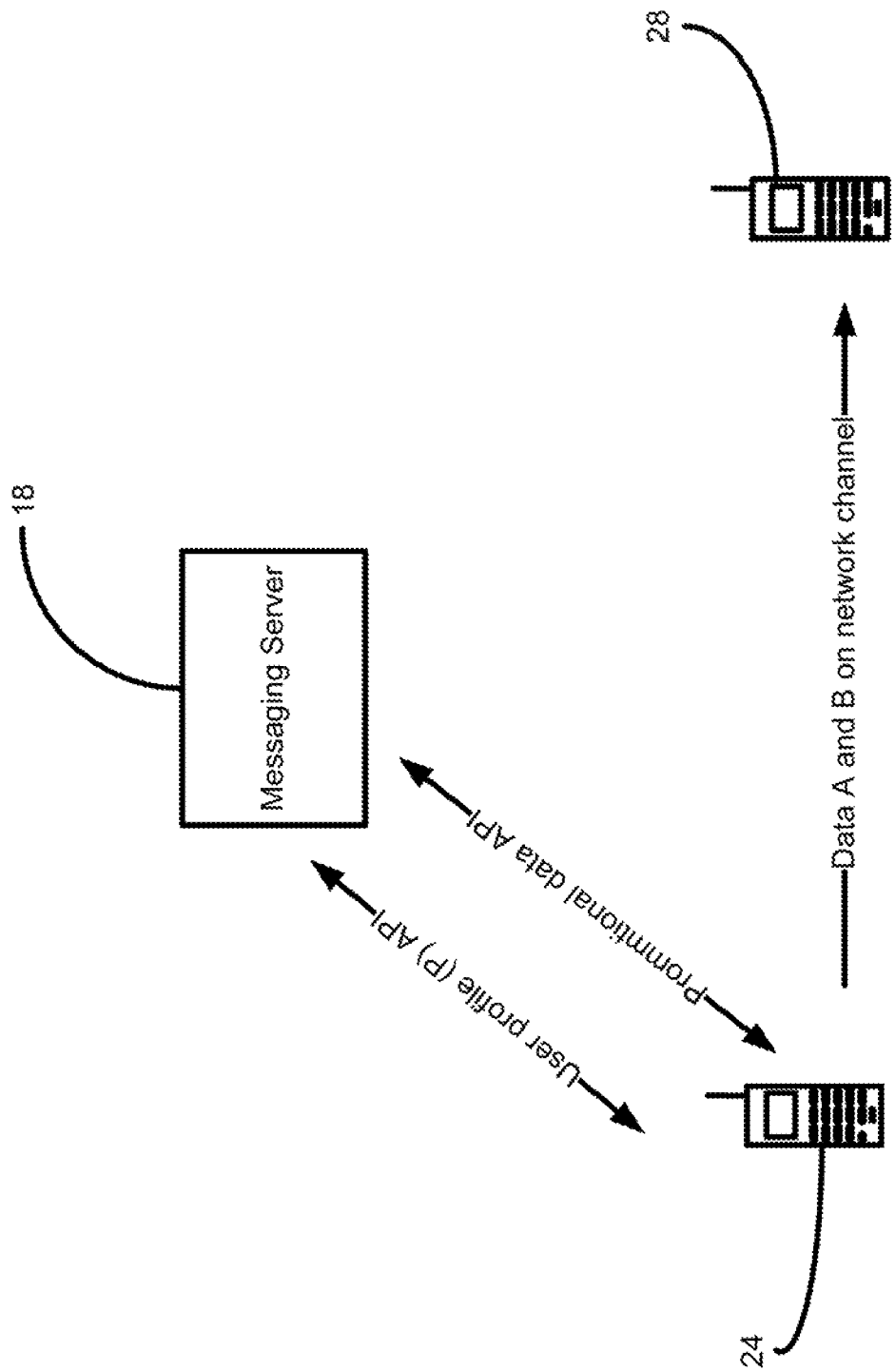
FIG. 6 is a simplified block diagram illustrating the combining and transmission of data using the Unicode® standard.

FIG. 6 is a simplified block diagram illustrating the combining and transmission of data using a universally accepted code versus image standard, such as the Unicode® standard. In FIG. 6, the IMGR app enabled communications terminal 24 may send a message using the Unicode® standard to a non-enabled IMGR app communications terminal 28. In this scenario, the communications terminal 24 composes a message for transmission to the non-enabled IMGR app communications terminal 28, although the communications terminal 28 does include a conventional text/SMS app. The processor 70 is programmed to recognize that the contact information of the communications terminal 28 does not utilize the IMGR app via the user profile API and automatically utilizes the Unicode® processes protocol. For example, a logo or graphical image may be added to the official Unicode® standard.

The messaging server 18 stores and determines all of the master users profile data (P), and centralized promotional data (B). The messaging server communicates to the IMGR app enabled communications terminal 24 via the User Profile API and Promotional Data API the most updated information pertaining to the user of the communications terminal 24, the promotional data, and what data to be displayed with the message data A.

Within the communications terminal 24, once it is determined that the receiving communications terminal 28 is not IMGR app enabled, the processor 70 and memory 72 of the communications terminal 24 enables the Unicode protocol (or other universal accepted standard of codes versus images) and automatically attaches an encoded brand promotion image and includes it with the text message data A. In a similar fashion as sending an emoji with a message, the present message may utilize a graphic image from the Unicode standard and combine it with a text message A. The data A and B may then be sent via the network channel to the communications terminal 28.

As the receiving communications terminal 28 is not IMGR app enabled, a normal or conventional text/SMS app is utilized. The text message data may be displayed with the encoded promotional image. For example, an encoded image may be seen in a message bubble with the text message data as one cohesive message.

Figure 7:
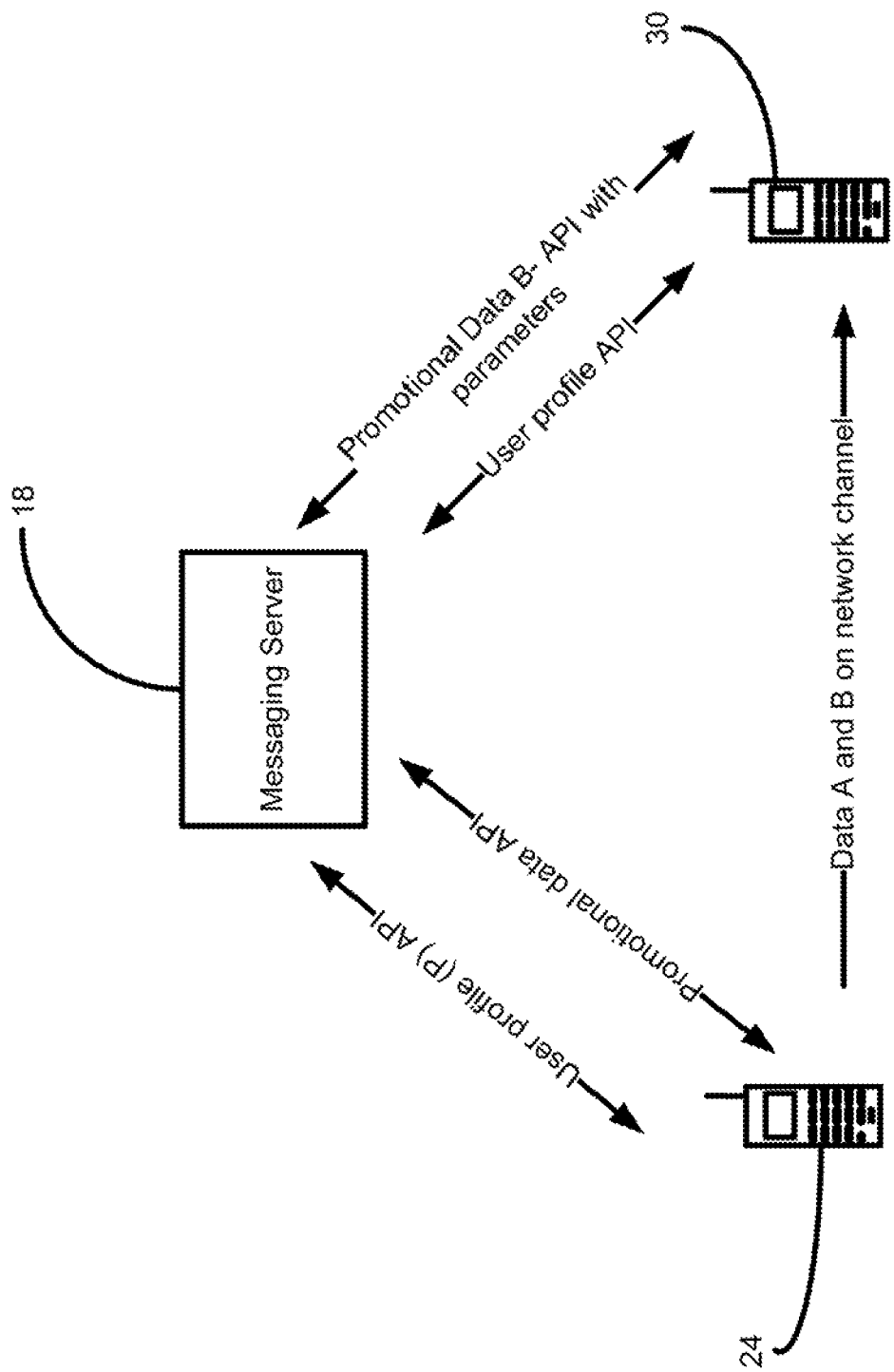
FIG. 7 is a simplified block diagram illustrating a sending communications terminal sending encoded promotional data to a receiving communications terminal using encoded promotional data via the network channel.

FIG. 7 is a simplified block diagram illustrating a scenario where the sending communications terminal 24 sends encoded promotional data to a receiving communications terminal 30 using encoded promotional data via the network channel. In this scenario, both the communications terminal 24 and communications terminal 30 are IMGR app enabled. In this embodiment of the represent invention, the message server 18 functions in a similar fashion providing a standard between IMGR app enabled communications terminal. These standard encoded values may be stored in the memory 52 of the messaging server. In this embodiment, the combined data may be sent via the network channel using the encoded values. For example, promotional data (B) may include the graphic image, text link, actual URL behind the link, the bubble color and any other promotional data and encode this promotional data (B) as a specific yet recognized code (by all IMGR app enabled communications terminals), e.g., V521FZ7.

The communications terminal 24 in FIG. 7 stores the encoded protocol in the memory 72. The processor 70 is programmed to automatically combine the encoded promotional data B with the text message data A. The entire data is automatically combined and sent together via the network channel. The messaging server 18 may provide all the same functionalities as discussed in FIGS. 1-5. The messaging server may store a master encoded table and pass the table and any updates to all IMGR app enabled communications terminals via the promotional API.

The processor 70 of the communications terminal 24 uses the encoded protocol and automatically combines the encoded promotional data B (i.e., the code signifying the specified promotional data) and includes text message A through the combiner 74. Thus, two sets of data are combined and sent as one cohesive message, for example a text message A ("Lets meet at the mail.") with the promotional data B (e.g., alpha numeric encoded V521F27). This combined data is sent via the network channel to the communications terminal 30.

The communications terminal 30, which is IMGR app enabled, receives the combined data and display both the text message (A) and the image or promotional material represented by the alphanumeric code as one cohesive message.

As discussed above for FIG. 6, the sending communications terminal may send promotional data via the network channel as encoded Unicodes® from the Unicode® standard. This was only possible with the assumption that the graphics being sent had actually been added to the Unicode® standard. In FIG. 7, this embodiment may be utilized when the images or graphics are not part of the Unicode® standard by using an encoded method and sent via the network channel. In the embodiment discussed in FIG. 7, the promotional data, including graphics and images may be encoded and sent via the network channel under certain circumstances. Specifically, both the sending and receiving communications terminals must be IMGR app enabled. In this embodiment, the sending communications terminal 24 may automatically combine and send promotional data (as a code) together with the conventional message A via the network channel. The processor in the sending communications terminal combines an alpha numeric code that represents the full promotional data that is stored on both the sending and receiving communications terminals. Therefore, in this embodiment, the entire set of promotional data is encoded. In Table 1 below, examples of codes which may be used and associated with specific brands are shown. XXX, YYY, and ZZZ represent examples of brands which are being promoted.

TABLE 1

| Promotional Sets of Data | Alpha/Numeric Encoded Value |
| --- | --- |
| 1. Promotional Image Graphic (xxx-logo.jpg) 2. Text Link (New Invisible SHIELD>) 3. The actual URL behind the text link 4. Bubble color (Green) 5. Other promotional data. | V521FZ7 |
| 1. Promotional Image Graphic (yyy-logo.jpg) 2. Text Link (Tap for 20% Off Shirts) 3. The actual URL behind the text link 4. Bubble color (Blue) 5. Other promotional data. | C698DW9 |
| 1. Promotional Image Graphic (zzz.jpg) 2. Text Link (Support ZZZ) 3. The actual URL behind the text link 4. Bubble color (Purple) 5. Other promotional data. | N259ES5 |

All promotional sets of data are communicated via the promotional API to all IMGR app enabled communications terminals in real time from the messaging server 18. The promotional sets of data are also referenced as encoded values and stored in tables, and those data tables are also stored on the server 18 and on the local communications terminals. In this embodiment, the processor 70 of the sending communication terminal may automatically combine the text/message data together with the encoded promotional data and send the combined encoded data directly to the IMGR app enabled receiving communications terminal 30 via the network channel. The communications terminal 30 has the same encoded value tables as the communications terminal 24 (originally received from the promotional API from the messaging server 18). The processor 70 in the communications terminal 30 is able to then access and display the entire stored promotional data as referenced in the tables. This is an important and novel feature because it allows for the complete and direct communication or transfer of all data from one IMGR app enabled communications terminal 24 to another communications terminal 30 via the network channel. In this embodiment, the entire combined message data (text/message and promotional data) can bypass the messaging server and be sent directly to the receiving communications terminal 30 via the network channel. Furthermore, in one embodiment of the present invention, the sending communications terminal which sends encoded data directly via the network channel may influence logic programmed in the receiving communications terminal's processor 70 for determining which set of promotional data to display.

As discussed above, the present invention may be utilized in several different ways. In one embodiment, combined data (promotional data and conventional message) can all be sent through the data channel. Specifically, all IMGR app enabled combined data can all be sent or received via the data channel. In another embodiment, all this combined data can be sent or received via the network channel. In still another embodiment, the data may be combined and sent or received by sending part of the data via the data channel and part of the data through the network channel. The present invention may combine and send or receive and combine data to provide the promotional data with the conventional message. As discussed in FIG. 1, the received convention message may be combined by the processor 70 of the receiving communications terminal with the promotional data stored in the receiving communications terminal. Likewise, the processor 70 of the sending communications terminal may automatically combine the conventional message data and the promotional data and then send the combined data. As discussed in FIGS. 1 and 2, the present invention provides a unique and novel way of storing the promotional material and combining the promotional material with a convention text message. In the present invention, in one embodiment of the present invention, promotional data from the messaging server 18 is received by a communications terminal and stored locally in the memory 72 of the communications terminal 24. The processor 70 includes a combiner 74 which combines the received text message data A with the stored promotional data B and then displays both sets of data as one cohesive message, so as if it appears both sets of data are associated or connected in some fashion (see FIG. 4).

Furthermore, the display of promotional data (i.e. the text link) may be configured through the settings application within the receiving communications terminal 24. For example, setting the messaging font size within the application will affect the font size of the promotional data display. A unique feature of the present invention is that it allows the receiving, or in some embodiments the sending communications terminal to determine certain elements of how an advertisement or promotional data is be displayed. Furthermore, either the user of the receiving communications terminal may select categories of interest. These preferences may be sent to the messaging server 18 and utilized by the processor 54 for determining the types of promotions displayed to the receiving user. Additionally, in another embodiment of the present invention, the sending communications terminal, which is IMGR app enabled, may send data (via the promotional API) within each individual message sent that could influence the logic on the messaging server 18 for communicating specific promotional data B being sent to each specific individual receiving communications terminal 24. Thus, the sending communications terminal 22 (with IMGR app enablement) may determine which promotions (from the centralized promotional data B will be displayed in the receiving device within each one of their sent messages. {This discusses where either user can change the settings]

Another novel element of the present invention is that the ability of a user receiving a displayed promotion is triggered by the actions of one of the receiving users contacts sending the user a message. This is a unique feature of displaying advertisements or promotions from any other kind of digital advertising method in that in order for an advertisement or promotion to be displayed is dependent upon the receipt of a personal message from a contact. The promotions are not just blasted out randomly on the messaging display. An action is required from a person contact (specifically sending a singular message from one communication terminal to another). Additionally, another unique element is that promotional data may be received from the messaging server 18 and stored in the memory 72 of the receiving communications terminal 24 only once. Another download only takes place when updates are required to the promotional data. The processing and displaying of graphic images in this manner is an improvement as it reduces the amount of data traveling over the network.

In one embodiment of the present invention, a user may locally (i.e., within the user's communications terminal) create a pre-packaged data personal promotion. The technical process enables the creation of multiple sets of pre-packaged data that can then be programmed to be automatically included within outgoing messages. The additional technical process of being able to set the technology to automatically rotate the packages, and additionally an interface that enables the user to select one of the packages as desired for a select message may be programmed within the processor 70 of the communications terminal. Furthermore, any images or graphics that is included within the pre-packaged data that are sent and are new, may be stored and updated within the memory 52 of the messaging server 18. These graphics are downloaded only once to subsequent receiving communications terminals (IMGR app enabled), and stored locally within the communications terminal's memory. In one embodiment, these newly created graphics or images are promotional data which is added with other promotional images stored in the memory 52 of the messaging server 18. Since the images may be stored on the main messaging server 18, and then sent as needed and stored on the local receiving communications terminals, subsequent messages with the same referenced image/graphic may be referenced as codes, or alpha numeric sets. This is an improvement on existing promotional systems because as these specific personally created graphics are shared or sent multiple times to the same recipients, further downloads of the same image or not necessary, thereby decreasing data usage.

In another embodiment of the present invention, the processor 70 may be programmed to enable a user to create a text link for usage in an instant message. The process of and the ability to create and displaying a hyperlink that will display in the receiving device as a text link is possible in the present invention. This is a significant improvement in that it substantially reduces the amount of space within a message that might be taken up by the inclusion of a long form URL. This feature enables the sender to illustrate the meaning or reason for the link right within the text link itself. There is no existing system which converts a long URL link into a text link within a text message or an instant message. It may appear to be similar to an html-based text hyperlink, but these are not the same. Currently there is no instant messaging or text messaging application that has the ability to convert a long URL into a text link.

As discussed above, the present invention may include the feature of encoding and utilizing a plurality of Unicodes®. For example, promotional images created within the promotional system 10 may be incorporated with the Unicode® standard. When sending messages, an IMGR app enabled communications terminal may send a code signifying the promotional data while an IMGR app enabled communications terminal may receive and interpret the code as the promotional data already stored locally in the receiving communications terminal's memory. Promotional images may be supported by the symbols subcommittee in the Unicode® set of principles and added to the mapping tables. If the image becomes a part of the Unicode® standard, then those promotional brand images could be transmitted via the network channel as shown in FIG. 6 rather than through the data channel as shown in FIG. 1. This would allow for a more universally accepted protocol for the sharing of branded messages. Hence, someone without an IMGR app enabled communications terminal may be able to receive a promotional image. A unique element of this embodiment is that the messaging serve may communicate via the promotional API to the IMGR app enabled communication terminal while the processor 72 processes and automatically combines through the combiner 74 the promotional image (in Unicode® format) to the outgoing message. The text message data would be sent along with the encoded image data to the recipient non-IMGR app enabled communications terminal. Although, Unicodes® are referenced above, any universally acceptable code protocol may be used.

In an embodiment where a sending communications terminal is IMGR app enabled, the processor 70 of the sending communications terminal determines if the receiving communications terminal is IMGR app enabled via the user profile API. If the receiving communication terminal is not IMGR app enabled, then the Unicode® protocol may be applied. The processor 70 and combiner 74 within the local sending communication terminal automatically combines an encoded promotional image (as communicated by the promotional API) and sends the combined message with encoded image to the recipient communication terminal (non-IMGR app enabled) via the network channel.

In another embodiment, the user of the sending communications terminal enabled with the IMGR app may establish settings within the sending communications terminal (in conjunction with the messaging server 18 via the promotional API) that could determine which encoded promotional images are included within each individually sent message. The images may originate from the messaging server 18 or by images created by the user within the IMGR app enabled communication terminal. In this scenario, in order for user created images to be included (i.e., via the network channel) those images would need to have been added and approved by the Unicode® standard as discussed in FIG. 6.

In another embodiment of the present invention, users of the communications terminals within the promotional system 10 may receive compensation for sending and/or receiving messages to their personal contacts. There are several different processes and calculations which may be utilized in determining compensation for users. In a first compensation embodiment, the user of the sending communications terminal is preferably and solely responsible for determining the data that influences the logic that determines which promotional set of data the recipient (with an IMGR app enabled communications terminal) receives through the processor 70. Additionally there is no "opt out" option (the option to receive or not to receive ads) for the receiving device. In this embodiment, the primary point calculation is determined by data taken from the formula 1 calculations and combined and used together to determine the results in the formula 2 calculation discussed below. Additional data that may go into the overall point calculation may include data from formula 3 (shown below), and the Total Unique Recipients (TUR), Total Unique Senders (TUS) data, and User Action Taken (UAT). The formula 3 calculations and data from TUR, TUS, and UAT may be used optional. As discussed below, points and compensation mean the same (e.g., points=compensation and compensation=points). Data which is captured may include:

TAIDS=Total Advertiser ID's Sent
TMS=Total Messages Sent to all other IMGR Users (with or without AD ID's).
TMR=Total Messages Received (with or without Ad ID's)
TUR=Total Unique Recipients
TUS=Total Unique Senders
TDDR=Total Days in Date Range
UAT=User Action Taken Data which may be calculated include:
UAIDR=Unique Advertiser ID Ratio
TAIDUR=Total AD ID's per Unique Recipient
USRR=User Sent to Received Ratio
Points=Total User Points In formula 1, this formula is used for calculating User Sent to Received Ratio (USRR). This provides information as to the total number of messages sent per user compared to the total number of messages they received. This is important data because the USRR will be a key factor in determining the overall point calculation. In order to receive points, users must not only send messages but must also receive messages. The number of TAIDS sent are not factored into Formula 1. Formula 1 is:

$$\frac{TMS}{TMR} = USRR \ (USRR:1)$$

In Formula 2, the total points are calculated by using data ascertained from formula 1 and combined in the calculation of formula 2. This formula 2 equals the lesser of the (total messages [with ads] sent or total messages received) multiplied by 2. This is a key calculation designed to prevent fraudulent user activity. The calculation prevents someone from gaining points by simply sending out thousands of messages, but receiving very few or none in return (or vice versa). So that in order to gain points, it requires consistent two way messaging communication. Thus, if the Overall USRR is <1, this means the user received more promotions than he sent, then formula 2 is calculated by:

TAIDS×2=Total Points

However, if the Overall USRR is >1, this means the user sent more promotions than he received, and formula 2 is calculated as:

$$\frac{TAIDS}{\text{Ratio (Overall } USSR)} \times 2 = \text{Total Points}$$

Formula 3 is used for calculating the Unique Advertiser ID Ratio (UAIDR). This provides information refers to how many times one specific ad was sent to a unique recipient per day. Thus, the promotional system 10 may determine if a user is sent the same ad repeatedly, rather than sending many different ads (which is preferred). This is an optional point adjuster. Depending on the overall UAIDR calculation, this data may or may not be used for adjusting or calculating point totals. Thus, the follow provides a calculation of the UAIDR:

$$\frac{TAIDS}{TUR} = TAIDUR \div TDDR = UAIDR \ (UAIDR\text{:}1)$$

TUR (Total Unique Recipient) and TUS (Total Unique Senders) data may also be calculated and provides information as to how many unique contacts the sending user had, who received messages with advertisements, and who sent the messages. If a user is sending and receiving only to a single other IMGR user, it may not be as valuable as sending and receiving to multiple different users. This is also an optional point adjuster. Depending on the TUR and TUS values, this data may or may not be used for adjusting or calculating point totals.

In another calculation UAT (User Action Taken) may also be calculated. The user of the sending and/or the receiving device may receive points, or compensation based on an action taken on the promotion (UAT). For example, if a user clicks on a promotional link, or makes a purchase based on action taken from the promotion, points may be awarded.

In a second compensation embodiment, the centralized messaging server 18 is responsible for determining the promotional set of data that the recipient (being IMGR app enabled) receives. The sender communication terminal may or may not have the ability to influence the promotional logic on the messaging server. In this embodiment a user may receive points as determined by the following data and formulas. There may be an "opt out" option (option to receive or not to receive promotions) for the receiving communications terminal. Using data from TUR, TUS, and UAT may optionally be used in the overall calculation. As in the first compensation embodiment, points and compensation are the same. In this embodiment, the TAIDR. TMS, and UAT data may be captured by the messaging server 18. The USRR and points are then calculated. First in formula 4, the USRR is calculated for the USRR. This information as to the total number of messages sent (to other IMGR app enabled communications terminals) from a specific IMGR app enabled communication terminal, compared to the total number of messages (with ads) received. This is important data because the USRR will be a key factor in determining the overall point calculation. In order to receive points, users must not only receive messages (with advertisements) but must also send messages to other IMGR users. Formula 4 is:

$$\frac{TMS}{TAIDR} = USRR \ (USRR\text{:}1)$$

Formula 5 is utilized for calculating the total points. Users receive points for every message they send (to other IMGR app enabled communications terminals) and every message they receive (with advertisements) subject to the following formula. This formula equals the lesser of the total messages sent to other IMGR app enabled communications terminals or the total messages with advertisements received multiplied by 2. This is a key fraud detection calculation that prevents someone from gaining points by simply receiving thousands of messages with ads, but sending very few messages or none in return. This is configured in this fashion in order to gain points it requires consistent two way messaging communication. If the Overall USRR is <1 (meaning the user received more promotions than messages sent):

TMS×2=Total Points.

If the Overall USRR is >1 (meaning the user sent more messages than promotions received):

TAIDR×2=Total Points.

TUR and TUS may also be calculated. As discussed for the first compensation embodiment, this information provides how many unique contacts the user has, who are sending and receiving messages with them. If a user is sending and receiving messages to only a single other IMGR user, it may not be as valuable as sending and receiving to multiple different users. This is an optional point adjuster. Furthermore, the UAT may be taken, where the user of the sending and/or the receiving device may receive points, or compensation based on an action taken on the promotion (UAT).

In a third compensation embodiment, the points and/or compensation is solely determined by a sending and/or receiving user action taken on a promotion (UAT). For example, if a user clicks on a promotional link or makes a purchase based on action taken from the promotion, points may be allotted to the user. In this embodiment, UAT data is obtained and used to calculate the compensation.

To determine if revenue may be earned, in one embodiment, when the IMGR app is downloaded to the communications terminal, each user may be provided with a unique identification number which may be appended in some fashion to the link (e.g., URL) for commission tracking. In another embodiment, the application may be the pre-installed in the communications terminal and assigned the unique identification number at the time of installation. In another embodiment, each image/graphic sent is associated to the sending user's identification number and utilized for tracking commissions. In still another embodiment, the application may utilized a communications terminal's phone identification number (unique for a mobile phone) to track promotions being sent and to track commissions received by the receiving phone identification number. Additionally, actions taken (e.g., views, clicks, purchases) by a sending communications terminal may be tracked by using a phone identification number of the sending terminal.

In still another embodiment, using software in the IMGR app of the user communication terminal and/or the messaging server 18, promotion data may be logged and tracked using unique identifications sent by the sending communications terminal 22 and/or the receiving communications terminal 24. Additionally, unique phone identification numbers such as Internet Protocol (IP) addresses may be utilized for determining promotion data metrics.

Although the present invention may be utilized in any electronic messaging system (e.g., emails), the present invention is preferably utilized in instant messaging systems. Numerous sources dearly distinguish an instant message from other forms of communication and should not be confused with emails or website advertisements. As defined in the present invention, an instant message is a real-time, text-based communication similar to chat. An instant message uses a shared software client between or among two or more people using communications terminals. All communication is conducted via a communications network. In addition, text messages (which are instant messages) are defined in the present invention as real time or near real time communication between two or more users logged into a specific messaging server. Instant messaging is more interactive than e-mail because messages are sent immediately, whereas e-mail can be queued up in a mail server for seconds or minutes. Furthermore, an instant message provides an instant push notification upon receipt of an instant message.

The present invention provides many advantages over existing messaging systems. The present invention enables the automatic combining of at least two sets of data, the promotional data and the conventional instant message, triggered by the sending or receiving of the conventional instant message. The user may be provided with a wide variety of settings to enable a desired promotion being sent to another user. The present invention provides for the automatic selection and combining of a promotion to a message without needlessly involving the user. Additionally, in one embodiment, a compensation scheme may be used to provide payments or incentives of any kind to the sending user. Furthermore, the present invention enables the personification of message with color backgrounds desired by the sending user or a specific promotion being sent to the recipient user.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A messaging system for combining a set of promotional data with an instant message, the system comprising:
a network;
a sending communications terminal connected to the network and having a sending processor programmed for sending an instant message via the network;
a recipient communications terminal connected to the network configured to receive an instant message from the sending communications terminal n comprising a user profile Application Program Interface (API), the user profile API providing an interface between the recipient communications terminal and the message server configured to automatically update user profile information of the recipient communications terminal in the message server;
wherein the user profile API is configured to receive user profile information from a plurality of contacts listed in the recipient communications terminal, each contact having a communications terminal using the messaging system;
a messaging server providing instant messaging service to the sending communications terminal and the recipient communications terminal to enable transmittal of an instant message from the sending communications terminal to the recipient communications terminal;
a combiner residing in a processor configured to combine a singular instant message sent from the sending communications terminal to the recipient communications terminal and the set of promotional data into a single cohesive message, wherein the set of promotional data is integrated and remain fully within a body of the instant message to form the single cohesive message;
the sending communications terminal comprising a promotional data API, the promotional data API providing an interface between the sending communications terminal and the message server configured to automatically update the set of promotional data;
wherein the set of promotional data is fully displayed within the instant message in the body of the instant message;
wherein the combiner sizes the body of the instant message to accommodate both the set of promotional data and the instant message within the body of the instant message, thereby forming the single cohesive message;
wherein the recipient communications terminal has a recipient processor for processing the instant message and presenting the set of promotional data with the instant message as a cohesive message on a messaging display of the recipient communications terminal.

2. The messaging system according to claim 1 wherein the combiner resides in the recipient communications terminal.

3. The messaging system according to claim 2 wherein the recipient communications terminal includes a memory for storing a plurality of sets of promotional data.

4. The messaging system according to claim 3 wherein the stored plurality of sets of promotional data are periodically updated by the messaging server having a master plurality of sets of promotional data.

5. The messaging system according to claim 2 wherein the recipient processor of the recipient communications terminal determines which promotion to combine with a received instant message.

6. The messaging system according to claim 2 wherein the instant message is routed through a data channel via the messaging server to the recipient communications terminal.

7. The messaging system according to claim 2 wherein the instant message is routed through a network channel to the recipient communications terminal and the set of promotional data is combined with the instant message in the recipient communications terminal.

8. The messaging system according to claim 1 wherein the combiner resides in the messaging server.

9. The messaging system according to claim 8 wherein the messaging server includes a memory for storing a plurality of sets of promotional data.

10. The messaging system according to claim 9 wherein the stored plurality sets of promotional data are sent and periodically updated to the recipient communications terminal or the sending communications terminal.

11. The messaging system according to claim 6 wherein the instant message is sent via the data channel through the messaging server to the recipient communications terminal.

12. The messaging system according to claim 8 wherein the messaging server determines the set of promotional data to combine with the sent instant message.

13. The messaging system according to claim 1 wherein the combiner resides in the processor of the sending communications terminal.

14. The messaging system according to claim 7 wherein the cohesive message is sent via the network channel through the messaging server to the recipient communications terminal.

15. The messaging system according to claim 13 wherein the processor of the sending communications terminal is programmed to enable a user to manually create a second set of promotional data within the sending communications terminal, the second set of promotional data being combined with instant messages and sent to the recipient communications terminal.

16. The messaging system according to claim 15 wherein the created second set of promotional data includes creating a tappable text link for forwarding a user to another source of information.

17. The messaging system according to claim 13 wherein the sending processor determines which promotion to combine with the instant message.

18. The messaging system according to claim 1 wherein:
the sending communications terminal sends a code associated with a specific set of promotional data to the recipient communications terminal;
the recipient processor interprets the code and selects an appropriate set of promotional data;
the recipient processor and the combiner combining the selected appropriate set of promotional data into the cohesive message.

19. The messaging system according to claim 18 wherein the code is related to a universal protocol utilized by a plurality of communications terminals.

20. The messaging system according to claim 1 wherein the cohesive message is located within the messaging display of the recipient communications terminal.

21. The messaging system according to claim 1 wherein the transmission and receipt of sets of promotional data with instant messages is tracked and compiled as tracking information and based upon the tracking information compensation is provided to a user of the recipient communications terminal.

22. The messaging system according to claim 13 wherein:
the processor of the sending communications terminal is programmed to enable a user to manually create the second set of promotional data within the sending communications terminal;
the processor of the sending communications terminal is programmed to enable the user to manually select the second set of promotional data to be combined with the instant message for transmission to the recipient communication terminal.

* * * * *